(12) United States Patent
Hong

(10) Patent No.: US 12,356,312 B2
(45) Date of Patent: Jul. 8, 2025

(54) COMMUNICATION CONTROL METHOD AND COMMUNICATION CONTROL APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 350 days.

(21) Appl. No.: 17/997,998

(22) PCT Filed: May 7, 2020

(86) PCT No.: PCT/CN2020/088990
§ 371 (c)(1),
(2) Date: Nov. 4, 2022

(87) PCT Pub. No.: WO2021/223157
PCT Pub. Date: Nov. 11, 2021

(65) Prior Publication Data
US 2023/0180101 A1 Jun. 8, 2023

(51) Int. Cl.
H04W 40/32 (2009.01)
H04W 68/02 (2009.01)
H04W 76/30 (2018.01)

(52) U.S. Cl.
CPC .......... H04W 40/32 (2013.01); H04W 68/02 (2013.01); H04W 76/30 (2018.02)

(58) Field of Classification Search
None
See application file for complete search history.

(56) References Cited

U.S. PATENT DOCUMENTS

| 2014/0162645 A1 | 6/2014 | Cui et al. |
| 2016/0057723 A1* | 2/2016 | Horn ............ H04W 76/28 |
| | | 455/435.2 |
| 2016/0269988 A1 | 9/2016 | Li et al. |

(Continued)

FOREIGN PATENT DOCUMENTS

| CN | 101453779 A | 6/2009 |
| CN | 101552944 A | 10/2009 |

(Continued)

OTHER PUBLICATIONS

WO 2014114082 (Year: 2014).*

(Continued)

*Primary Examiner* — Christopher T Wyllie
(74) *Attorney, Agent, or Firm* — Oblon, McClelland, Maier & Neustadt, L.L.P.

(57) ABSTRACT

A communication control method is provided. The communication control method can include sending information on radio access technologies supported by a terminal to a base station, receiving an association relationship between each of the radio access technologies and a corresponding service type from the base station, when it is required to perform communication of a service with the base station, determining a target radio access technology corresponding to the service type of the service based on the association relationship, and performing communication of the service with the base station based on the target radio access technology.

12 Claims, 13 Drawing Sheets

(56) References Cited

U.S. PATENT DOCUMENTS

| | | | |
|---|---|---|---|
| 2018/0176823 A1* | 6/2018 | Kim | H04W 48/06 |
| 2019/0174554 A1* | 6/2019 | Deenoo | H04W 68/005 |
| 2019/0313359 A1* | 10/2019 | Lee | H04W 76/14 |
| 2021/0105788 A1* | 4/2021 | Kim | H04L 41/0869 |
| 2022/0117005 A1* | 4/2022 | Yang | H04W 72/02 |
| 2023/0007527 A1* | 1/2023 | Baek | H04W 80/06 |
| 2024/0407043 A1* | 12/2024 | Jano | H04W 52/0229 |

FOREIGN PATENT DOCUMENTS

| | | | | |
|---|---|---|---|---|
| CN | 102271386 A | 12/2011 | | |
| CN | 103391597 A | 11/2013 | | |
| CN | 103974335 A | 8/2014 | | |
| CN | 105101345 A | 11/2015 | | |
| CN | 107079280 A | 8/2017 | | |
| WO | WO 2014/017873 A2 | 1/2014 | | |
| WO | WO 2014114082 | * | 7/2014 | H04W 28/10 |
| WO | WO 2015/074206 A1 | 5/2015 | | |

OTHER PUBLICATIONS

International Search Report with English Translation mailed on Jan. 26, 2021 in PCT/CN2020/088990 filed on May 7, 2020 (citing references 1-2 & 14-18, therein, 4 pages).

Chinese Office Action with English Translation issued Dec. 16, 2021 in Chinese Application No. 202080000879.3 (citing references 14 & 19-20, therein, 18 pages).

\* cited by examiner

COMMUNICATION CONTROL METHOD AND COMMUNICATION CONTROL APPARATUS

CROSS-REFERENCE TO RELATED APPLICATIONS

The present application is a U.S. national phase of International Application No. PCT/CN2020/088990 filed on May 7, 2020, the disclosure of which is hereby incorporated by reference in its entirety for all purposes.

BACKGROUND OF THE INVENTION

Field of the Invention

The present disclosure relates to the field of communication technologies, and in particular to a communication control method, a communication control apparatus, an electronic device and a computer readable storage medium.

Description of the Related Art

Along with the development of communication technologies, the 5th Generation Mobile Communication Technology (5G) communication protocol is proposed following the 4th Generation Mobile Communication Technology (4G) communication protocol. Compared with 4G, 5G has a larger communication bandwidth which can effectively increase a communication rate, helping satisfy requirements of users for ultrahigh traffic density, ultrahigh connection density and ultrahigh mobility. Therefore, excellent service experiences of high definition video, virtual reality, augmented reality, cloud desktop and online game etc. can be provided to users.

At present, more and more terminal devices may communicate based on 5G. However, during development and use processes of the devices, researchers find that the 5G devices will consume much more power than the 4G devices in a case of running same services.

SUMMARY OF THE INVENTION

In view of the above, in one or more embodiments of the present disclosure, a communication control method, a communication control apparatus, an electronic device and a computer readable storage medium are provided, so as to solve the technical problems of large power consumption of the terminals in the related arts.

According to a first aspect of the present disclosure, there is provided a communication control method, which is applied to a terminal and includes sending information on radio access technologies supported by the terminal to a base station, receiving an association relationship between each of the radio access technologies and a corresponding service type from the base station, when it is required to perform communication of a service with the base station, determining a target radio access technology corresponding to the service type of the service based on the association relationship; and performing communication of the service with the base station based on the target radio access technology.

According to a second aspect of the present disclosure, there is provided a communication control method, which is applied to a base station and includes receiving information on radio access technologies supported by a terminal from the terminal; establishing an association relationship between each of the radio access technologies and a corresponding service type, and sending the association relationship to the terminal.

According to a third aspect of the present disclosure, there is provided an electronic device, including a processor and a memory that is configured to store instructions executable by the processor. The processor is configured to perform the communication control method applicable to the terminal and/or the communication control method applicable to the base station according to any one of the above embodiments.

According to a fourth aspect of embodiments of the present disclosure, there is provided a computer readable storage medium, storing a computer program thereon, where the program is executed by a processor to perform the steps in the communication control method applicable to the terminal and/or the communication control method applicable to the base station according to any one of the above embodiments.

BRIEF DESCRIPTION OF THE DRAWINGS

In order to describe the technical solutions of the embodiments of the present disclosure more clearly, the drawings required for descriptions of the embodiments will be briefly introduced. Apparently, the drawings described below are only some embodiments of the present disclosure and those skilled in the art may obtain other drawings based on these drawings without making creative work.

DETAILED DESCRIPTION OF THE PREFERRED EMBODIMENTS

In combination with the drawings in the embodiments of the present disclosure, the technical solutions of the embodiments of the present disclosure will be clearly and fully described below. Apparently, the embodiments described herein are only some embodiments of the present disclosure rather than all embodiments. All other embodiments obtained by those skilled in the art based on the embodiments of the present disclosure without making creative work shall all fall within the scope of protection of the present disclosure.

Figure 1:
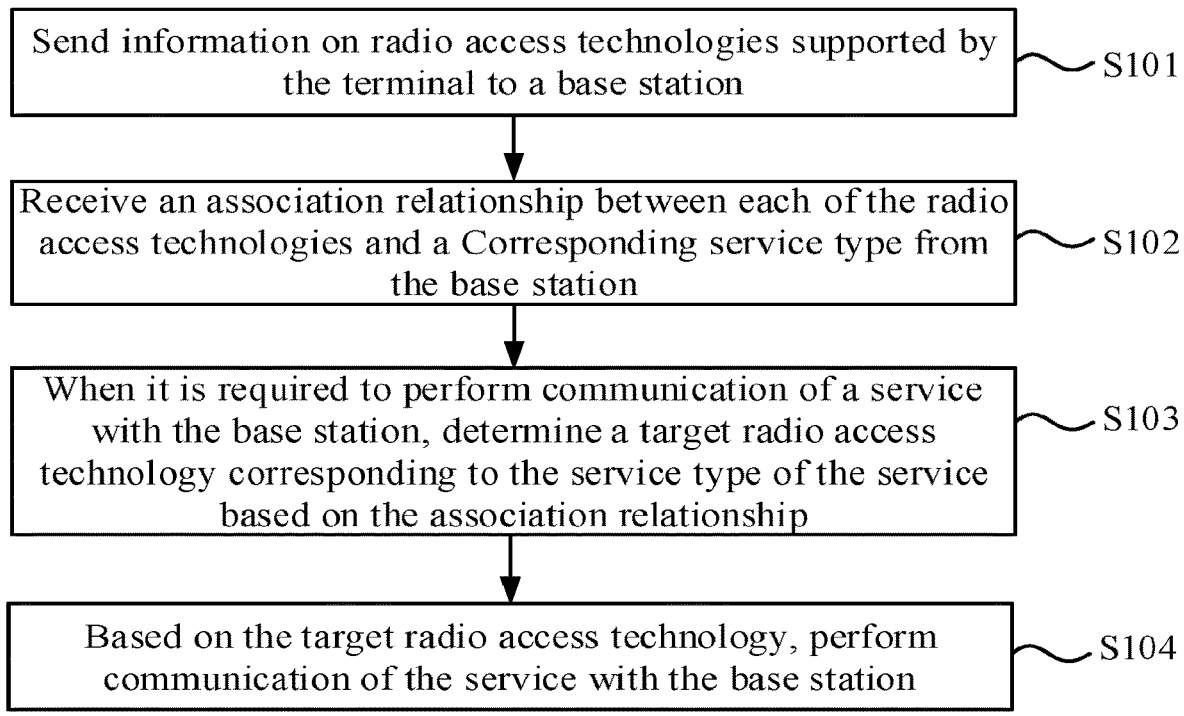
FIG. 1 is a flowchart illustrating a communication control method according to an embodiment of the present disclosure.

FIG. 1 is a flowchart illustrating a communication control method according to an embodiment of the present disclosure. The method in this embodiment may be applicable to a terminal. The terminal may include but not limited to a smart phone, a tablet computer, a wearable device or the like. The terminal may serve as a user equipment to communicate with a base station, where the terminal may be a multimode terminal and the base station may be a multimode base station.

As shown in FIG. 1, the communication control method may include the following steps.

At step S101, information on radio access technologies supported by the terminal is sent to a base station.

At step S102, an association relationship between each of the radio access technologies and a corresponding service type is received from the base station.

At step S103, when it is required to perform communication of a service with the base station, a target radio access technology corresponding to the service type of the service is determined based on the association relationship.

At step S104, based on the target radio access technology, communication of the service is performed with the base station.

In an example, the terminal may support multiple radio access technologies (RATs), and the RATs may be, for example, 5G, 4G, 3G, 2G, and the like.

The terminal may send the information on the radio access technologies supported by itself to the base station, and the base station may, after receiving the information on the radio access technologies from the terminal, determine, based on the information on the radio access technologies, those radio access technologies supported by the terminal so as to establish an association relationship between each of the radio access technologies and a corresponding service type.

The base station may predetermine communication rates supported by the radio access technologies and communication rates required by one or more service types (which are, for example, manually set), and further associate a service type requiring a relatively large communication rate with a radio access technology having a relatively large communication rate, so as to establish an association relationship between each of the radio access technologies and a corresponding service type.

For example, the radio access technologies supported by the terminal include 5G, 4G, 3G, and 2G, and the service types include video service, File Transfer Protocol (FTP) service, online service, voice service and the like. The base station may determine first communication rates supported by the above radio access technologies and second communication rates required by the above service types, and may further determine the matched first communication rate and second communication rate. A matching rule of the first communication rate and the second communication rate may be set based on actual requirements.

For example, if the first communication rate supported by 5G matches the second communication rate required by the video service, it can be determined that 5G and the video service are associated. Likewise, it can be determined that 4G and the FTP service are associated, 3G and the online service are associated, and 2G and the voice service are associated. Thus, an association relationship between each of the radio access technologies and a corresponding service type can be established and then sent to the terminal.

The terminal may receive the association relationship between each of the radio access technologies and the corresponding service type from the base station. When performing communication of a service with the base station subsequently, the terminal may determine a target radio access technology corresponding to a service type of the service based on the received association relationship and then perform communication of an uplink service with the base station based on the target radio access technology.

For example, an uplink service initiated by the terminal to the base station last time is a video service and a radio access technology corresponding to the video service is 5G. In this case, if an uplink service initiated to the base station this time is a FTP service, a radio access technology corresponding to the FTP service may be determined as 4G based on the association relationship. Hence, the terminal may switch from a mode based on 5G communication protocol to a mode based on 4G communication protocol.

Therefore, the radio access technology based on which the terminal and the base station communicate with each other can be changed based on the service type of the communication. Thus, the terminal may not always communicate based on a radio access technology (e.g. 5G) with large power consumption but switch to a radio access technology (e.g. 4G, 3G, or 2G) with small power consumption for communication based on the service type, thereby further reducing the power consumption in use of the terminal and improving the endurance capability of the terminal.

Figure 2:
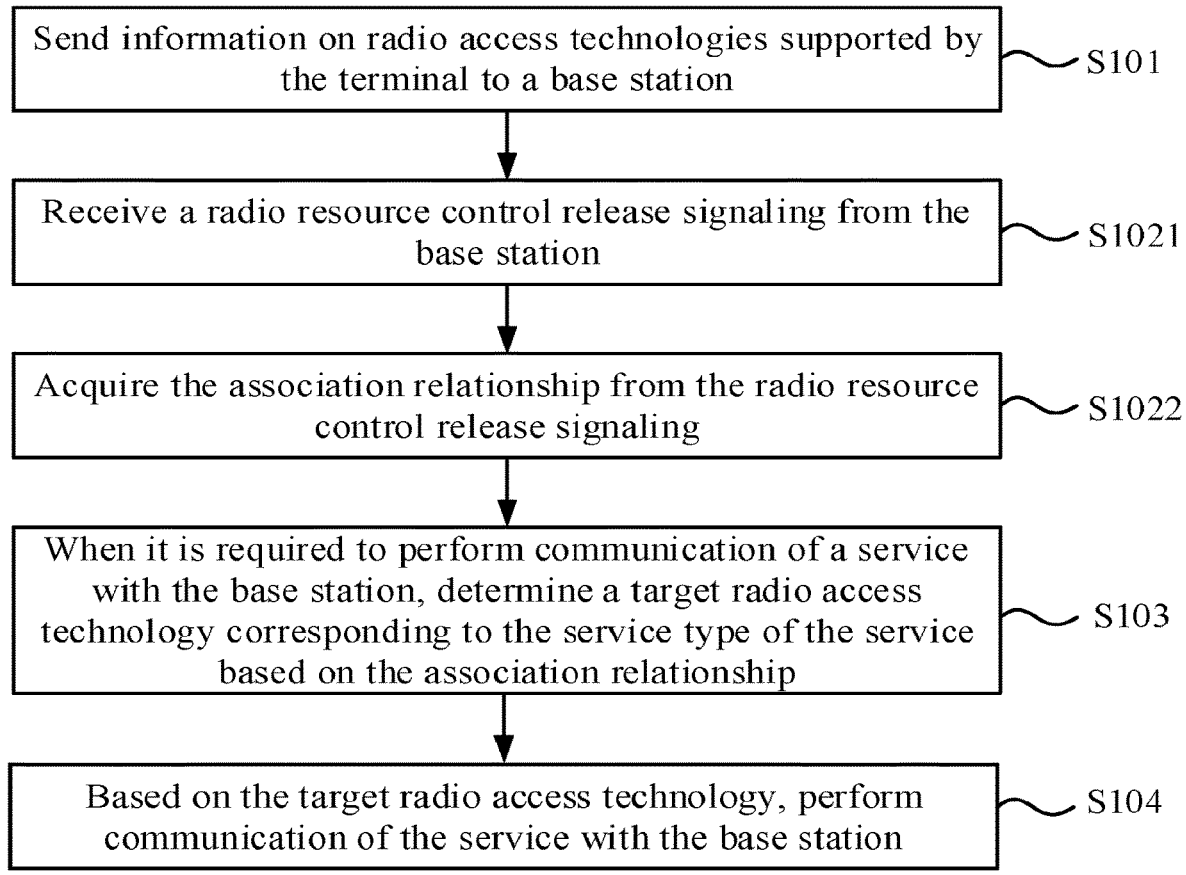
FIG. 2 is a flowchart illustrating another communication control method according to an embodiment of the present disclosure.

FIG. 2 is a flowchart illustrating another communication control method according to an embodiment of the present disclosure. As shown in FIG. 2, receiving the association relationship between each of the radio access technologies and the corresponding service type from the base station includes the following steps.

At step S1021, a radio resource control release signaling is received from the base station.

At step S1022, the association relationship is acquired from the radio resource control release signaling.

In an example, the base station may send a radio resource control release (RRCRelease) signaling to the terminal to instruct the terminal to interrupt an RRC connection with the base station. Since the radio resource control release signaling carries an association relationship between each of the radio access technologies and the corresponding service type which is established by the base station, the terminal may, after receiving the radio resource control release signaling, acquire the association relationship from the radio resource control release signaling.

Hence, the base station may not send the association relationship to the terminal through one piece of separate information but carry the association relationship in the sent radio resource control release signaling, thus helping reduce communication times between the base station and the terminal and save communication resources.

Furthermore, after receiving the radio resource control release signaling, the terminal may enter an idle state. In this case, it is convenient for the terminal to switch a radio access technology when subsequently initiating an uplink service to the base station. Therefore, the terminal may select a radio access technology associated with the service type of the uplink service for communication, without having to switch a radio access technology in a connected state.

Figure 3:
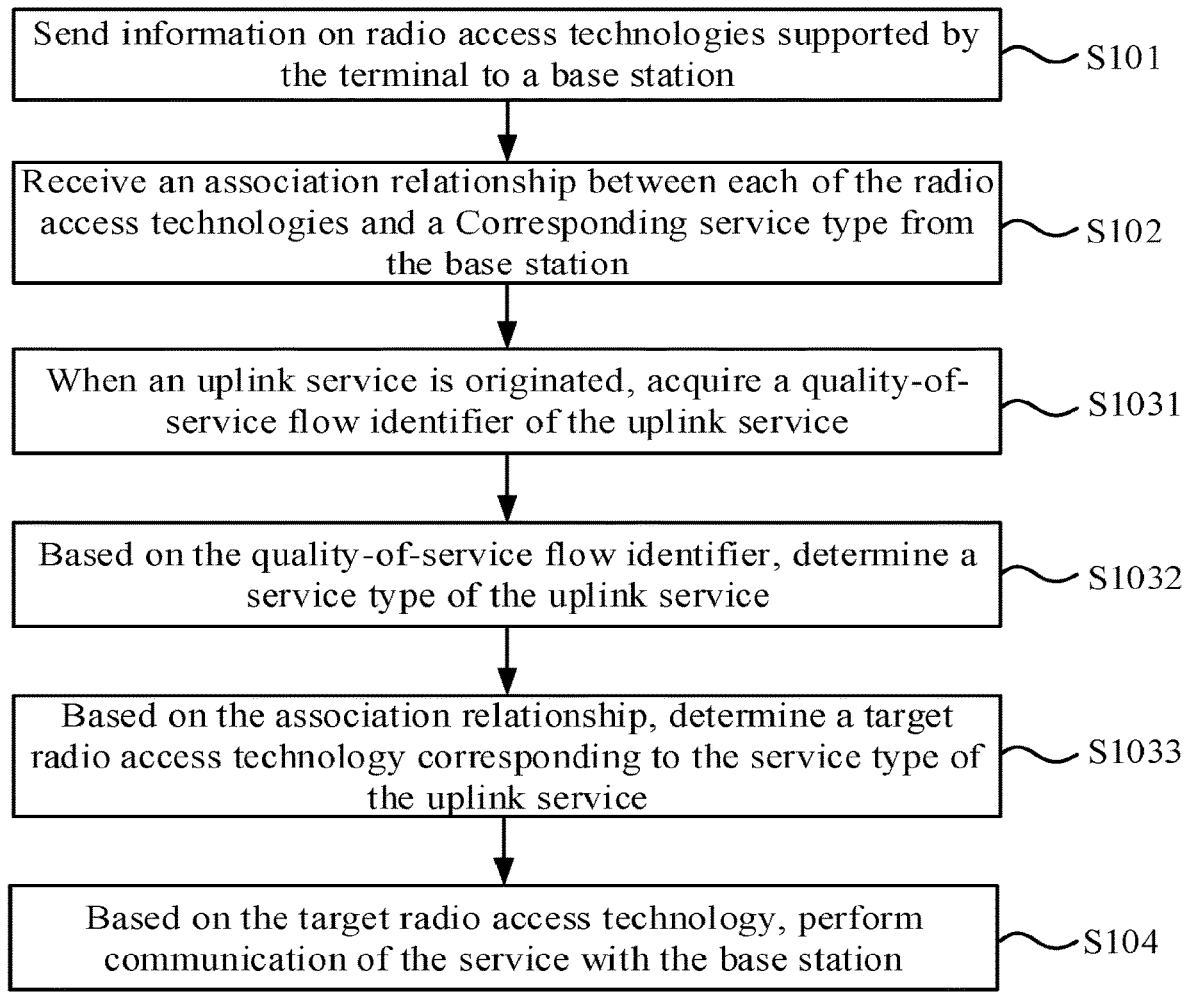
FIG. 3 is a flowchart illustrating another communication control method according to an embodiment of the present disclosure.

FIG. 3 is a flowchart illustrating another communication control method according to an embodiment of the present disclosure. As shown in FIG. 3, when it is required to perform communication of a service with the base station, determining the target radio access technology corresponding to the service type of the service based on the association relationship includes the following steps.

At step S1031, when an uplink service is initiated, a quality-of-service flow identifier of the uplink service is acquired.

At step S1032, based on the quality-of-service flow identifier, a service type of the uplink service is determined.

At step S1033, based on the association relationship, a target radio access technology corresponding to the service type of the uplink service is determined.

In an example, after receiving the radio resource control release signaling from the base station, the terminal may enter an idle state. When the terminal in the idle state initiates an uplink service to the base station subsequently, the terminal may firstly acquire a quality-of-service flow identifier (QoS Flow ID, shortened as QFI) of the uplink service, where the quality-of-service flow identifiers of the services of different service types may be different. Next, the terminal may determine a service type of the initiated uplink service based on the quality-of-service flow identifier, and then may determine a target radio access technology corresponding to the service type of the uplink service based on the association relationship, and then perform communication of the uplink service with the base station based on the determined target radio access technology.

Figure 4:
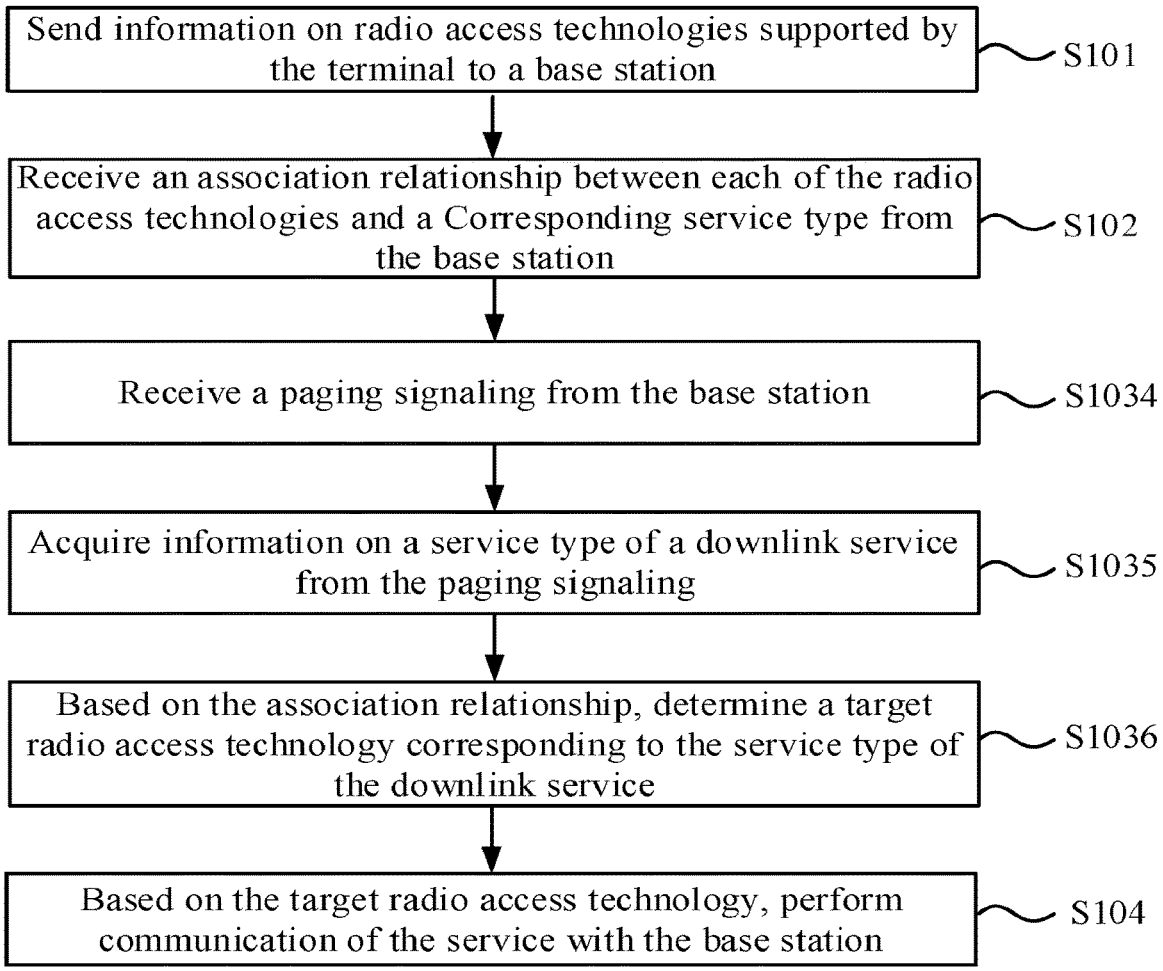
FIG. 4 is a flowchart illustrating another communication control method according to an embodiment of the present disclosure.

FIG. 4 is a flowchart illustrating another communication control method according to an embodiment of the present disclosure. As shown in FIG. 4, when it is required to perform communication of a service with the base station, determining the target radio access technology corresponding to the service type of the service based on the association relationship includes the following steps.

At step S1034, a paging signaling is received from the base station.

At step S1035, information on a service type of a downlink service is acquired from the paging signaling.

At step S1036, based on the association relationship, a target radio access technology corresponding to the service type of the downlink service is determined.

In an example, in addition to the fact that the terminal initiates an uplink service to the base station as mentioned in the above embodiment, the base station may also initiate a downlink service to the terminal. Since the terminal enters an idle state after receiving the radio resource control release signaling, for the purpose of performing communication with the terminal, the base station may firstly send a paging signaling such that the terminal is enabled to initiate a random access to the base station based on the paging signaling so as to establish a communication connection with the base station.

The base station may carry the service type of the downlink service to be initiated in the paging signaling sent to the terminal, and the terminal may acquire information on the service type of the downlink service initiated by the base station from the received paging signaling. Further, the terminal may determine a target radio access technology corresponding to the service type of the downlink service based on the pre-received association relationship and perform communication of the downlink service with the base station based on the target radio access technology.

Therefore, the base station may not indicate the service type of the downlink service to the terminal through one piece of separate information but carry the information on the service type of the downlink service in the sent paging signaling, thus helping reduce the communication times between the base station and the terminal and save the communication resources.

Figure 5:
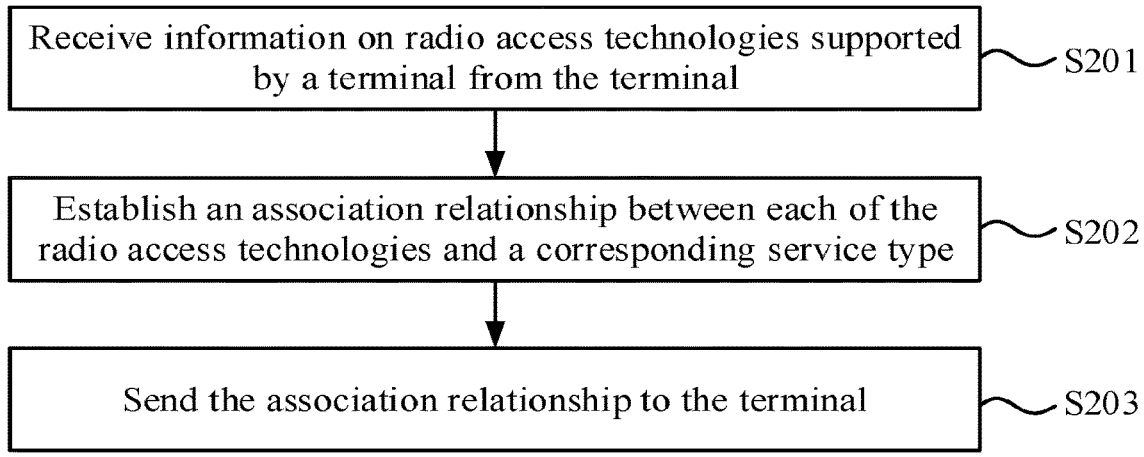
FIG. 5 is a flowchart illustrating a communication control method according to an embodiment of the present disclosure.

FIG. 5 is a flowchart illustrating a communication control method according to an embodiment of the present disclosure. The method in this embodiment may be applicable to a base station. The base station may be a multimode base station which can communicate with a terminal as a user equipment. The terminal may include but not limited to a smart phone, a tablet computer, a wearable device or the like. The terminal may serve as a user equipment to communicate with a base station, where the terminal may be a multimode terminal.

As shown in FIG. 5, the communication control method may include the following steps.

At step S201, information on radio access technologies supported by a terminal is received from the terminal.

At step S202, an association relationship between each of the radio access technologies and a corresponding service type is established.

At step S203, the association relationship is sent to the terminal.

In an example, the terminal may support multiple radio access technologies, and the radio access technologies may be, for example, 5G, 4G, 3G, 2G, and the like. The terminal may send the information on the radio access technologies supported by itself to the base station.

The base station may, after receiving the information on the radio access technologies from the terminal, determine those radio access technologies supported by the terminal based on the information on the radio access technologies so as to establish an association relationship between each of the radio access technologies and a corresponding service type. The base station may determine communication rates supported by radio access technologies and communication rates required by one or more service types (which are, for example, manually preset), and further associate service types requiring relatively large communication rates with radio access technologies having relatively large communication rates, so as to establish an association relationship between each of the radio access technologies and a corresponding service type.

For example, the radio access technologies supported by the terminal include 5G, 4G, 3G, and 2G, and the service types include video service, File Transfer Protocol (FTP) service, online service, voice service and the like. The base station may determine first communication rates supported by the above radio access technologies and second communication rates required by the above service types, and may further determine the matched first communication rate and second communication rate. A matching rule of the first communication rate and the second communication rate may be set based on actual requirements.

For example, if the first communication rate supported by 5G matches the second communication rate required by the video service, it can be determined that 5G and the video service are associated. Likewise, it can be determined that 4G and the FTP service are associated, 3G and the online service are associated, and 2G and the voice service are associated. Thus, an association relationship between each of the radio access technologies and a corresponding service type can be established and then sent to the terminal.

When the terminal initiates an uplink service to the base station after receiving the association relationship between each of the radio access technologies and a corresponding service type, the terminal may determine a target radio access technology corresponding to a service type of the uplink service based on the received association relationship and further perform communication of the uplink service with the base station based on the target radio access technology.

For example, an uplink service initiated by the terminal to the base station last time is a video service and a radio access technology corresponding to the video service is 5G. In this case, if an uplink service initiated to the base station this time is a FTP service, a radio access technology corresponding to the FTP service may be determined as 4G based on the association relationship. Hence, the terminal may switch from a mode based on 5G communication protocol to a mode based on 4G communication protocol.

Therefore, the radio access technology based on which the terminal and the base station communicate with each other can be changed based on the service type of the communication. Thus, the terminal may not always communicate based on a 5G mode with large power consumption but switch to a 4G mode with small power consumption for communication based on the service type, thereby further reducing the power consumption in use of the terminal and improving the endurance capability of the terminal.

Figure 6:
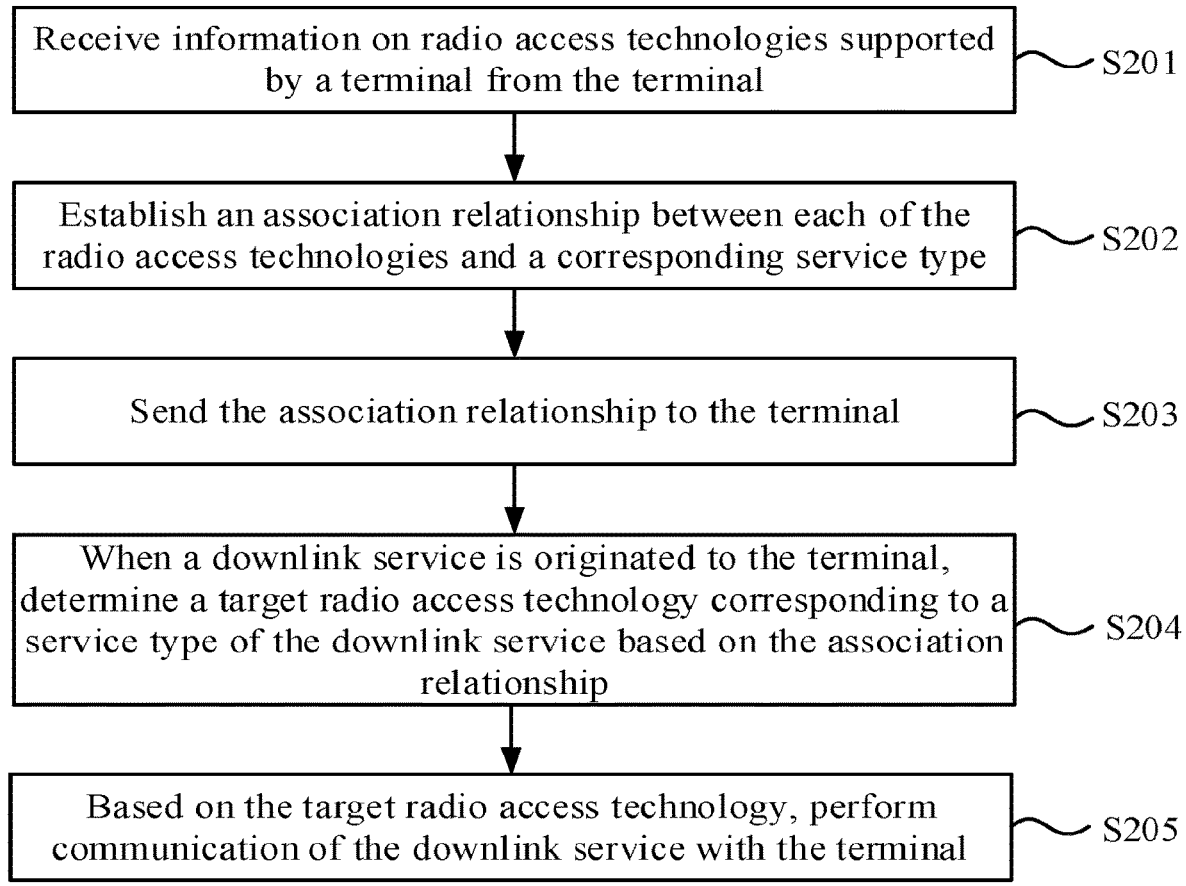
FIG. 6 is a flowchart illustrating another communication control method according to an embodiment of the present disclosure.

FIG. 6 is a flowchart illustrating another communication control method according to an embodiment of the present disclosure. As shown in FIG. 6, the method further includes the following steps.

At step S204, when a downlink service is initiated to the terminal, a target radio access technology corresponding to a service type of the downlink service is determined based on the association relationship.

At step S205, based on the target radio access technology, communication of the downlink service is performed with the terminal.

In an example, the base station may initiate a downlink service to the terminal. When initiating a downlink service to the terminal, the base station may determine a target radio access technology corresponding to a service type of the downlink service based on a pre-established association relationship, and further perform communication of the downlink service with the terminal based on the target radio access technology.

Figure 7:
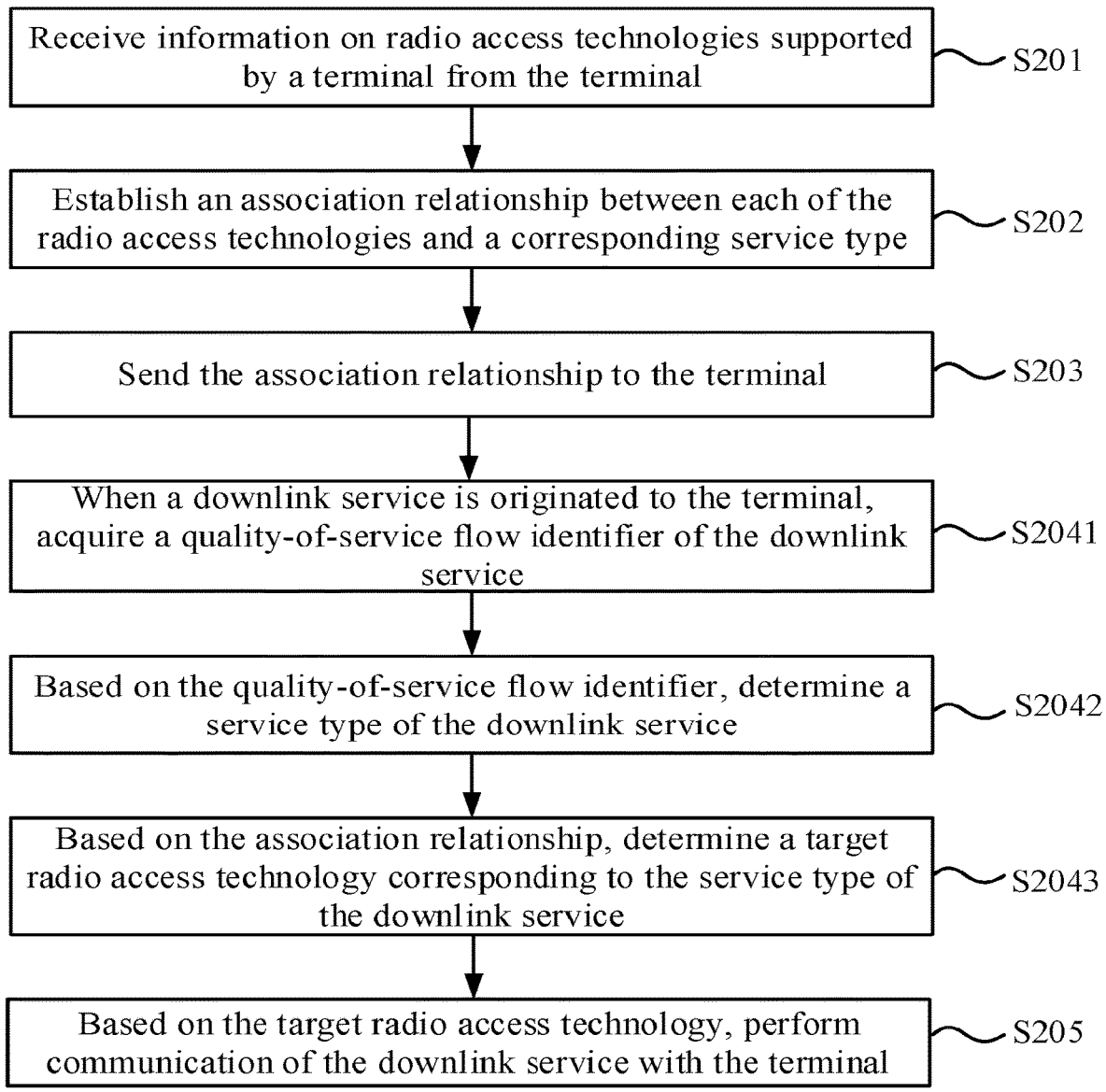
FIG. 7 is a flowchart illustrating another communication control method according to an embodiment of the present disclosure.

FIG. 7 is a flowchart illustrating another communication control method according to an embodiment of the present disclosure. As shown in FIG. 7, when a downlink service is initiated to the terminal, determining the target radio access technology corresponding to the service type of the downlink service based on the association relationship includes the following steps.

At step S2041, when a downlink service is initiated to the terminal, a quality-of-service flow identifier of the downlink service is acquired.

At step S2042, based on the quality-of-service flow identifier, a service type of the downlink service is determined.

At step S2043, based on the association relationship, a target radio access technology corresponding to the service type of the downlink service is determined.

In an example, when initiating a downlink service to the terminal, the base station may acquire a quality-of-service flow identifier of the downlink service, where the quality-of-service flow identifiers of the services of different service types may be different. Next, the base station may determine a service type of the initiated downlink service based on the quality-of-service flow identifier, and then determine a target radio access technology corresponding to the service type of the downlink service based on the association relationship, and then perform communication of the downlink service with the terminal based on the determined target radio access technology.

Figure 8:
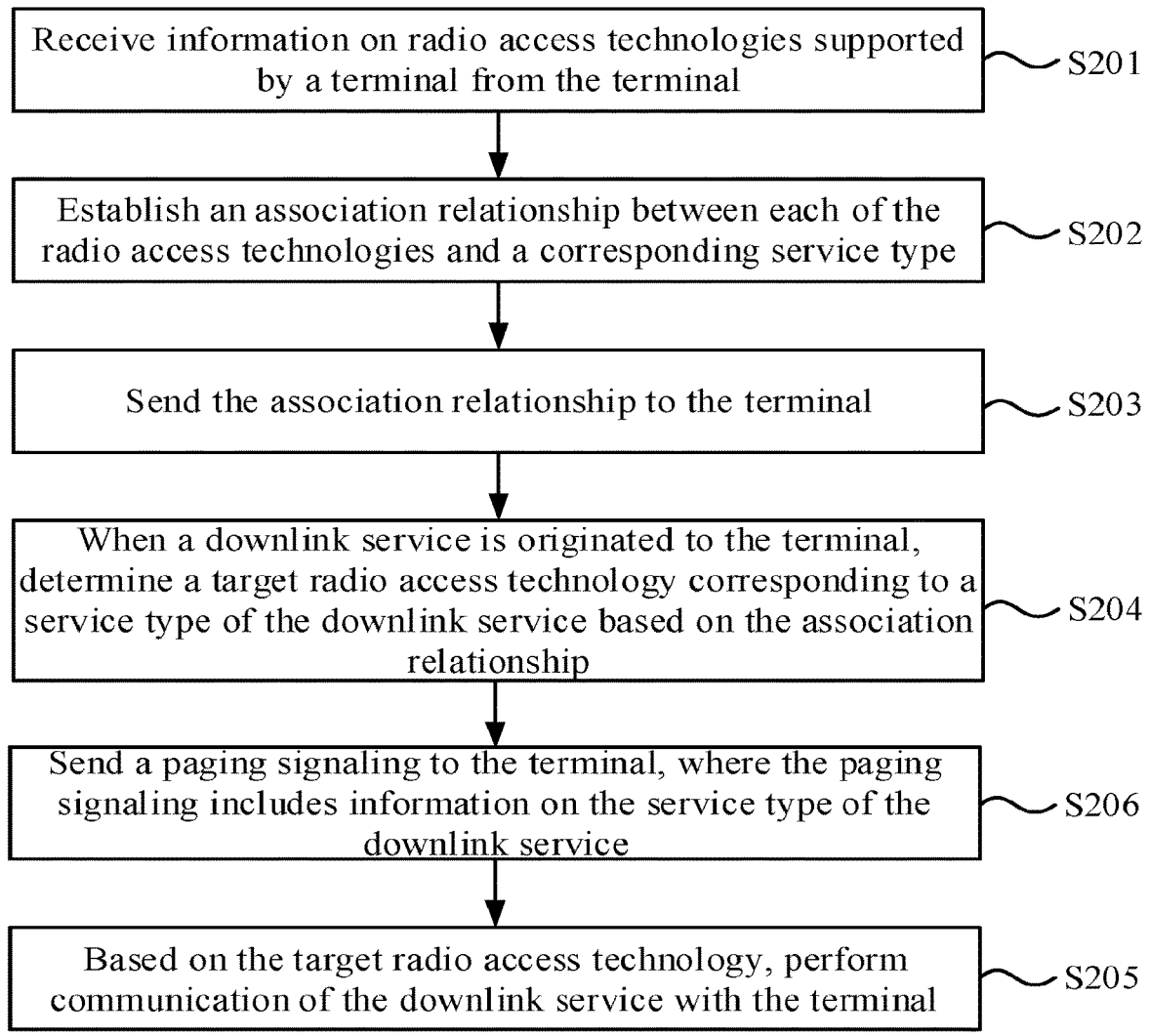
FIG. 8 is a flowchart illustrating another communication control method according to an embodiment of the present disclosure.

FIG. 8 is a flowchart illustrating another communication control method according to an embodiment of the present disclosure. As shown in FIG. 8, the terminal is in an idle state; before performing communication of the downlink service with the terminal based on the target radio access technology, the method further includes the following step: at step S206, a paging signaling is sent to the terminal, where the paging signaling includes information on the service type of the downlink service.

In an example, in order to perform communication with the terminal in an idle state, the base station may firstly send a paging signaling such that the terminal is enabled to initiate a random access to the base station based on the paging signaling, so as to establish a communication connection with the base station.

The base station may carry the service type of the downlink service to be initiated in the paging signaling sent to the terminal, and the terminal may acquire information on the service type of the downlink service initiated by the base station from the received paging signaling. Further, the terminal may determine a target radio access technology corresponding to the service type of the downlink service based on the pre-received association relationship and perform communication of the downlink service with the base station based on the target radio access technology.

Hence, the base station may not indicate the service type of the downlink service to the terminal through one piece of separate information but carry the information on the service type of the downlink service in the sent paging signaling, thus helping reduce communication times between the base station and the terminal and save communication resources.

Figure 9:
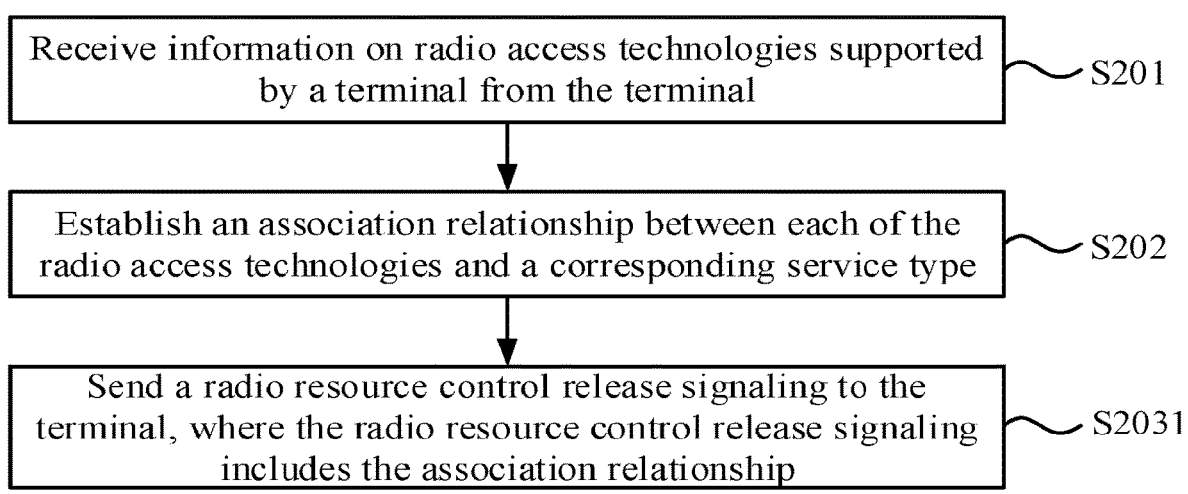
FIG. 9 is a flowchart illustrating another communication control method according to an embodiment of the present disclosure.

FIG. 9 is a flowchart illustrating another communication control method according to an embodiment of the present disclosure. As shown in FIG. 9, sending the association relationship to the terminal includes: At step S2031, a radio resource control release signaling is sent to the terminal, where the radio resource control release signaling includes the association relationship.

In an example, the base station may send a radio resource control release signaling to the terminal to instruct the terminal to interrupt an RRC connection with the base station. Since the radio resource control release signaling carries an association relationship between each of the radio access technologies and a corresponding service type which is established by the base station, the terminal may, after receiving the radio resource control release signaling, acquire the association relationship from the radio resource control release signaling.

Hence, the base station may not send the association relationship to the terminal through one piece of separate information but carry the association relationship in the sent radio resource control release signaling, thus helping reduce communication times between the base station and the terminal and save communication resources.

Figure 10:
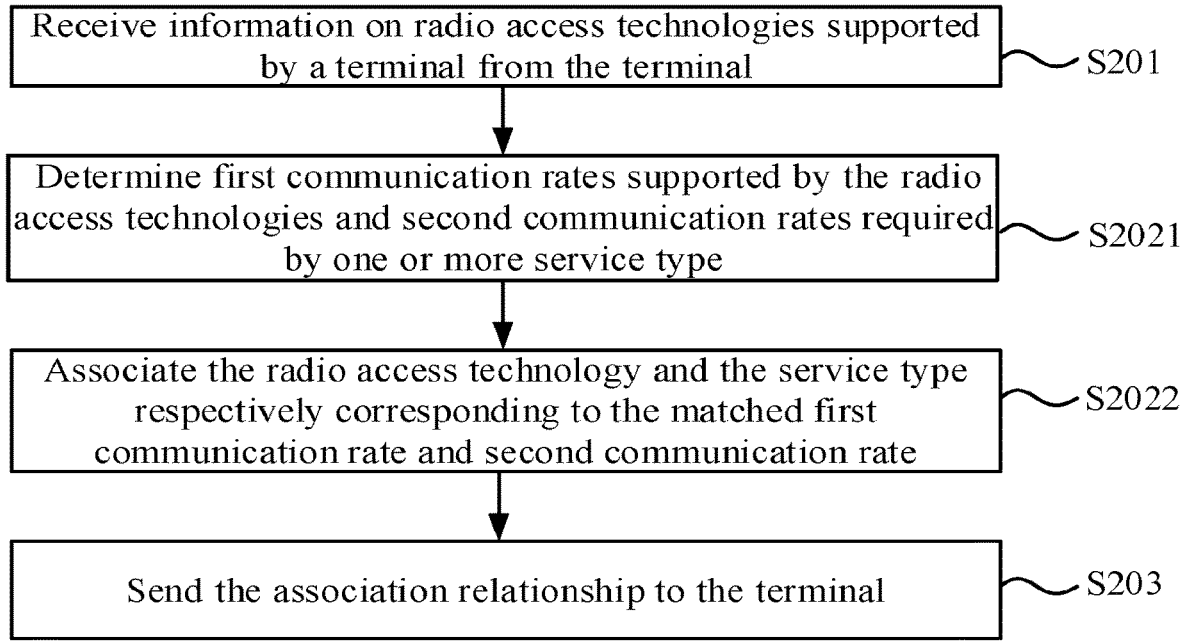
FIG. 10 is a flowchart illustrating another communication control method according to an embodiment of the present disclosure.

FIG. 10 is a flowchart illustrating another communication control method according to an embodiment of the present disclosure. As shown in FIG. 10, establishing the association relationship between each of the radio access technologies and the corresponding service type includes the following steps.

At step S2021, first communication rates supported by the radio access technologies and second communication rates required by one or more service types are determined.

At step S2022, the radio access technology and the service type respectively corresponding to the matched first communication rate and second communication rate are associated.

In an example, the base station may determine the first communication rates supported by the radio access technologies and the second communication rates required by the one or more service types (which are, for example, manually preset), and then determine the matched first communication rates and second communication rates, and then associate the radio access technologies and the service types respectively corresponding to the matched first communication rates and second communication rates, so as to establish an association relationship between the radio access technologies and the service types respectively corresponding to the matched first communication rates and second communication rates.

A matching rule of the first communication rates and the second communication rates may be set based on actual requirements, for example, may be determined automatically. Specifically, the first communicate rates supported by the radio access technologies are sorted and the second communication rates required by the service types are sorted; then, the first communication rate and the second communication rate sorted in a same sequence position are determined as mutually matched. For example, the matching rule of the first communication rates and the second communication rates may be manually preset.

Corresponding to the embodiments of the above communication control method, there is further provided an embodiment of a communication control apparatus.

Figure 11:
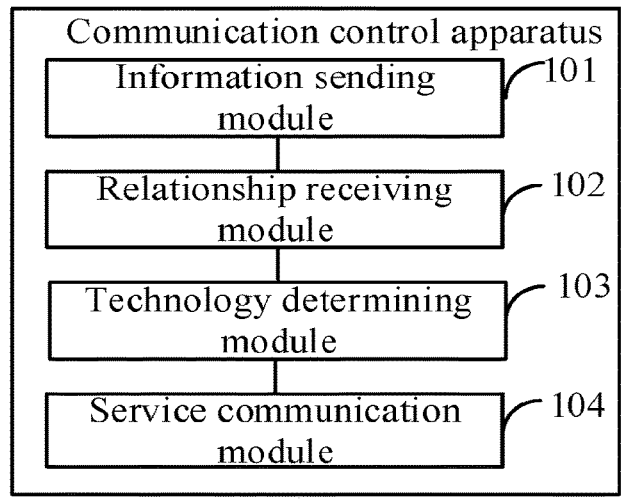
FIG. 11 is a schematic block diagram illustrating a communication control apparatus according to an embodiment of the present disclosure.

FIG. 11 is a schematic block diagram illustrating a communication control apparatus according to an embodiment of the present disclosure. The apparatus in this embodiment may be applicable to a terminal. The terminal may include but not limited to a smart phone, a tablet computer, a wearable device or the like. The terminal may serve as a user equipment to communicate with a base station, where the terminal may be a multimode terminal and the base station may be a multimode base station.

As shown in FIG. 11, the communication control apparatus may include an information sending module 101, configured to send information on radio access technologies supported by the terminal to a base station, a relationship receiving module 102, configured to receive an association relationship between each of the radio access technologies and a corresponding service type from the base station, a technology determining module 103, configured to, when it is required to perform communication of a service with the base station, determine a target radio access technology corresponding to the service type of the service based on the association relationship, and a service communication module 104, configured to, based on the target radio access technology, perform communication of the service with the base station.

In some examples, the information sending module is configured to receive a radio resource control release signaling from the base station; and acquire the association relationship from the radio resource control release signaling.

Figure 12:
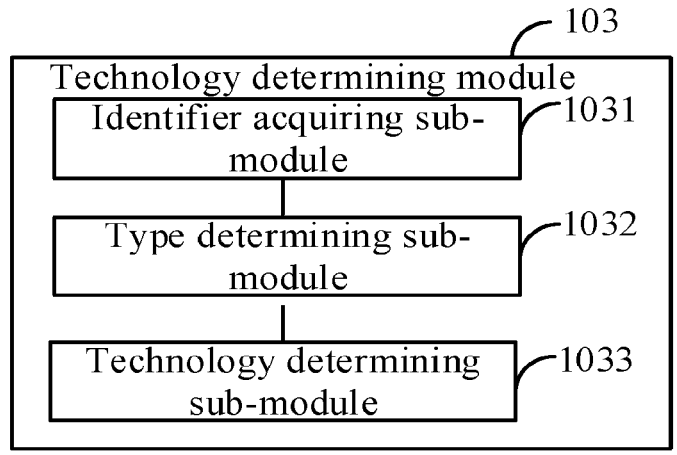
FIG. 12 is a schematic block diagram illustrating a technology determining module according to an embodiment of the present disclosure.

FIG. 12 is a schematic block diagram illustrating a technology determining module according to an embodiment of the present disclosure. As shown in FIG. 12, the technology determining module 103 includes an identifier acquiring sub-module 1031, configured to, when initiating an uplink service, acquire a quality-of-service flow identifier of the uplink service, a type determining sub-module 1032, configured to, based on the quality-of-service flow identifier, determine a service type of the uplink service, and a technology determining sub-module 1033, configured to, based on the association relationship, determine a target radio access technology corresponding to the service type of the uplink service.

Figure 13:
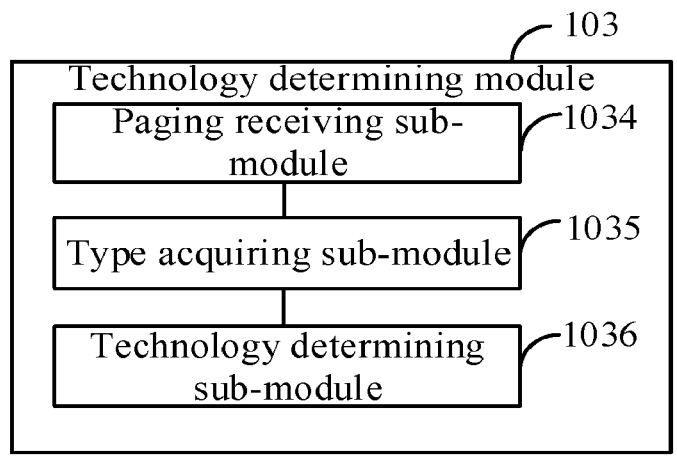
FIG. 13 is a schematic block diagram illustrating another technology determining module according to an embodiment of the present disclosure.

FIG. 13 is a schematic block diagram illustrating another technology determining module according to an embodiment of the present disclosure. As shown in FIG. 13, the technology determining module 103 includes a paging receiving sub-module 1034, configured to receive a paging signaling from the base station, a type acquiring sub-module 1035, configured to acquire information on a service type of a downlink service from the paging signaling, and a technology determining sub-module 1036, configured to, based on the association relationship, determine a target radio access technology corresponding to the service type of the downlink service.

Figure 14:
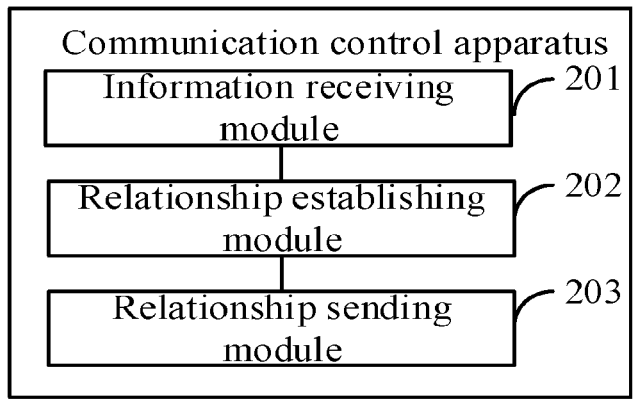
FIG. 14 is a schematic block diagram illustrating a communication control apparatus according to an embodiment of the present disclosure.

FIG. 14 is a schematic block diagram illustrating a communication control apparatus according to an embodiment of the present disclosure. The apparatus in this embodiment may be applicable to a base station. The base station may be a multimode base station which can communicate with a terminal as a user equipment. The terminal may include but not limited to a smart phone, a tablet computer, a wearable device or the like. The terminal may serve as a user equipment to communicate with a base station, where the terminal may be a multimode terminal.

As shown in FIG. 14, the communication control apparatus may include an information receiving module 201, configured to receive information on radio access technologies supported by a terminal from the terminal, a relationship establishing module 202, configured to establish an association relationship between each of the radio access technologies and a corresponding service type, and a relationship sending module 203, configured to send the association relationship to the terminal.

Figure 15:
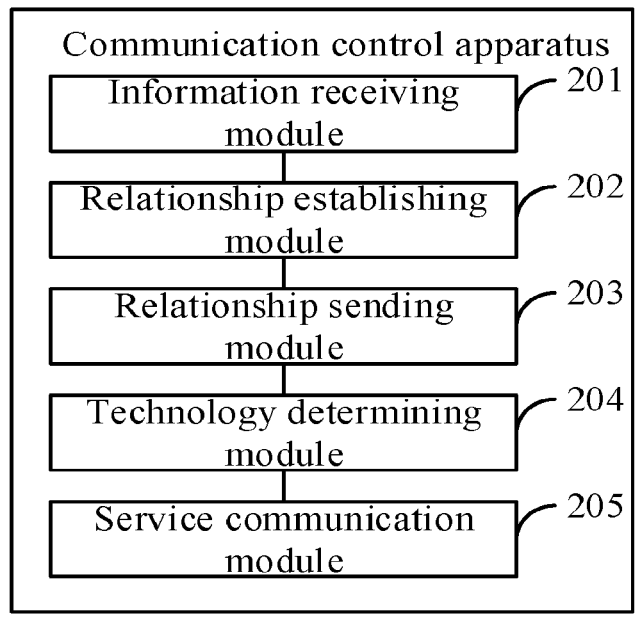
FIG. 15 is a schematic block diagram illustrating another communication control apparatus according to an embodiment of the present disclosure.

FIG. 15 is a schematic block diagram illustrating another communication control apparatus according to an embodiment of the present disclosure. As shown in FIG. 15, the apparatus further includes a technology determining module 204, configured to, when initiating a downlink service to the terminal, determine a target radio access technology corresponding to a service type of the downlink service based on the association relationship, and a service communication module 205, configured to, based on the target radio access technology, perform communication of the downlink service with the terminal.

Figure 16:
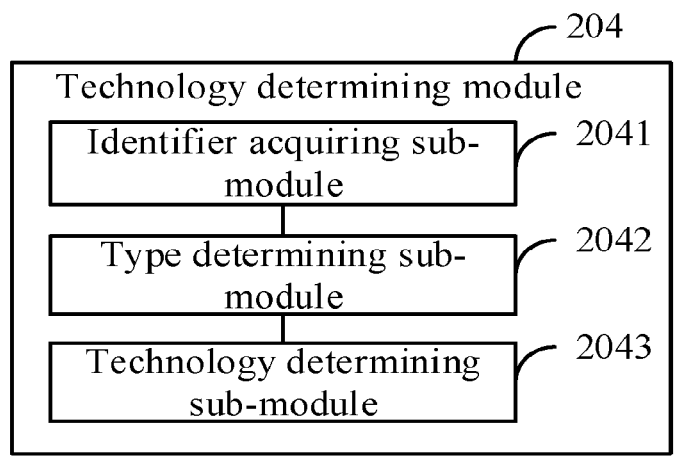
FIG. 16 is a schematic block diagram illustrating a technology determining module according to an embodiment of the present disclosure.

FIG. 16 is a schematic block diagram illustrating a technology determining module according to an embodiment of the present disclosure. As shown in FIG. 16, the technology determining module 204 includes an identifier acquiring sub-module 2041, configured to, when initiating a downlink service to the terminal, acquire a quality-of-service flow identifier of the downlink service, a type determining sub-module 2042, configured to, based on the quality-of-service flow identifier, determine a service type of the downlink service, and technology determining sub-module 2043, configured to, based on the association relationship, determine a target radio access technology corresponding to the service type of the downlink service.

Figure 17:
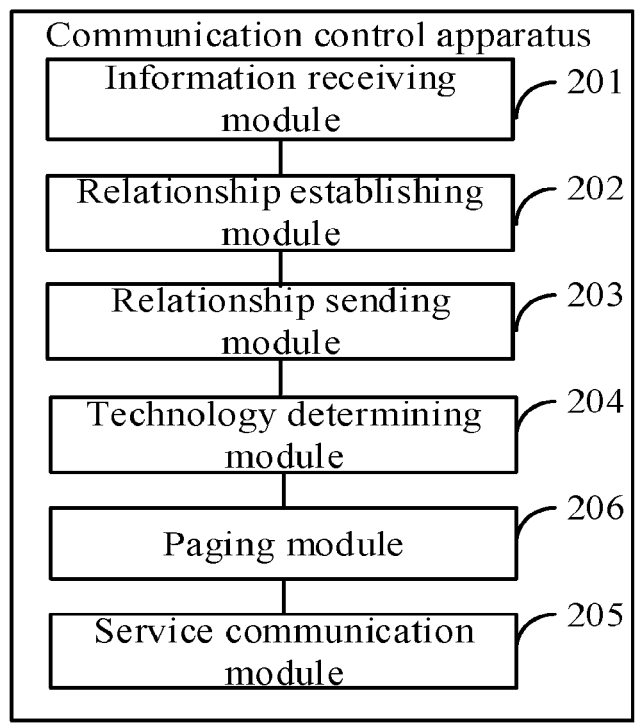
FIG. 17 is a schematic block diagram illustrating another communication control apparatus according to an embodiment of the present disclosure.

FIG. 17 is a schematic block diagram illustrating another communication control apparatus according to an embodiment of the present disclosure. As shown in FIG. 17, the terminal is in an idle state, and the apparatus further includes a paging module 206, configured to send a paging signaling to the terminal, where the paging signaling includes information on the service type of the downlink service.

In some examples, the relationship sending module is configured to send a radio resource control release signaling to the terminal, where the radio resource control release signaling includes the association relationship.

Figure 18:
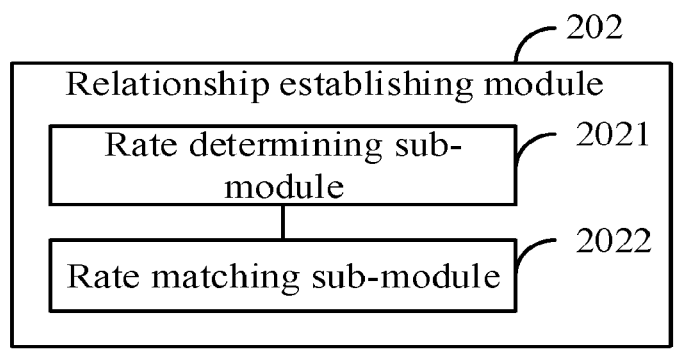
FIG. 18 is a schematic block diagram illustrating a relationship establishing module according to an embodiment of the present disclosure.

FIG. 18 is a schematic block diagram illustrating a relationship establishing module according to an embodiment of the present disclosure. As shown in FIG. 18, the relationship establishing module 202 includes a rate determining sub-module 2021, configured to determine first communication rates supported by the radio access technologies and second communication rates required by one or more service types, a rate matching sub-module 2022, configured to associate the radio access technology and the service type respectively corresponding to the matched first communication rate and second communication rate.

The specific manner in which the modules in the apparatus in the above embodiments perform operations is already detailed in the embodiments of the relevant methods and will not be repeated herein.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as modules may be or not be physical modules, i.e., may be located in one place, or may be distributed to a plurality of network modules. Part or all of the modules may be selected according to actual requirements to implement the objectives of the solutions in the embodiments. Those of ordinary skill in the art may understand and carry out them without creative work.

In an embodiment of the present disclosure, there is further provided an electronic device, including a processor and a memory for storing instructions executable by the processor. The processor is configured to perform the communication control method applicable to the terminal and/or the communication control method applicable to the base station according to any one of the above embodiments.

In an embodiment of the present disclosure, there is further provided a computer readable storage medium, storing a computer program thereon, where the program is executed by a processor to perform the steps in the communication control method applicable to the terminal and/or the communication control method applicable to the base station according to any one of the above embodiments.

Figure 19:
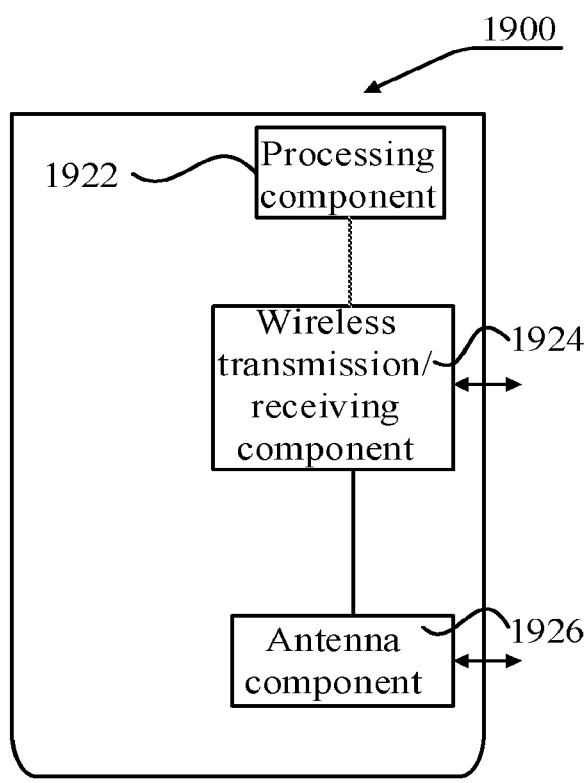
FIG. 19 is a schematic diagram illustrating an apparatus for communication control according to an embodiment of the present disclosure.

FIG. 19 is a schematic diagram illustrating an apparatus 1900 for communication control according to an embodiment of the present disclosure. The apparatus 1900 may be provided as a base station. As shown in FIG. 19, the apparatus 1900 includes a processing component 1922, a wireless transmission/receiving component 1924, an antenna component 1926, and a signal processing part specific to a wireless interface. The processing component 1922 may further include one or more processors. One processor in the processing component 1922 may be configured to perform the communication control method applicable to the base station according to any one of the above embodiments.

Figure 20:
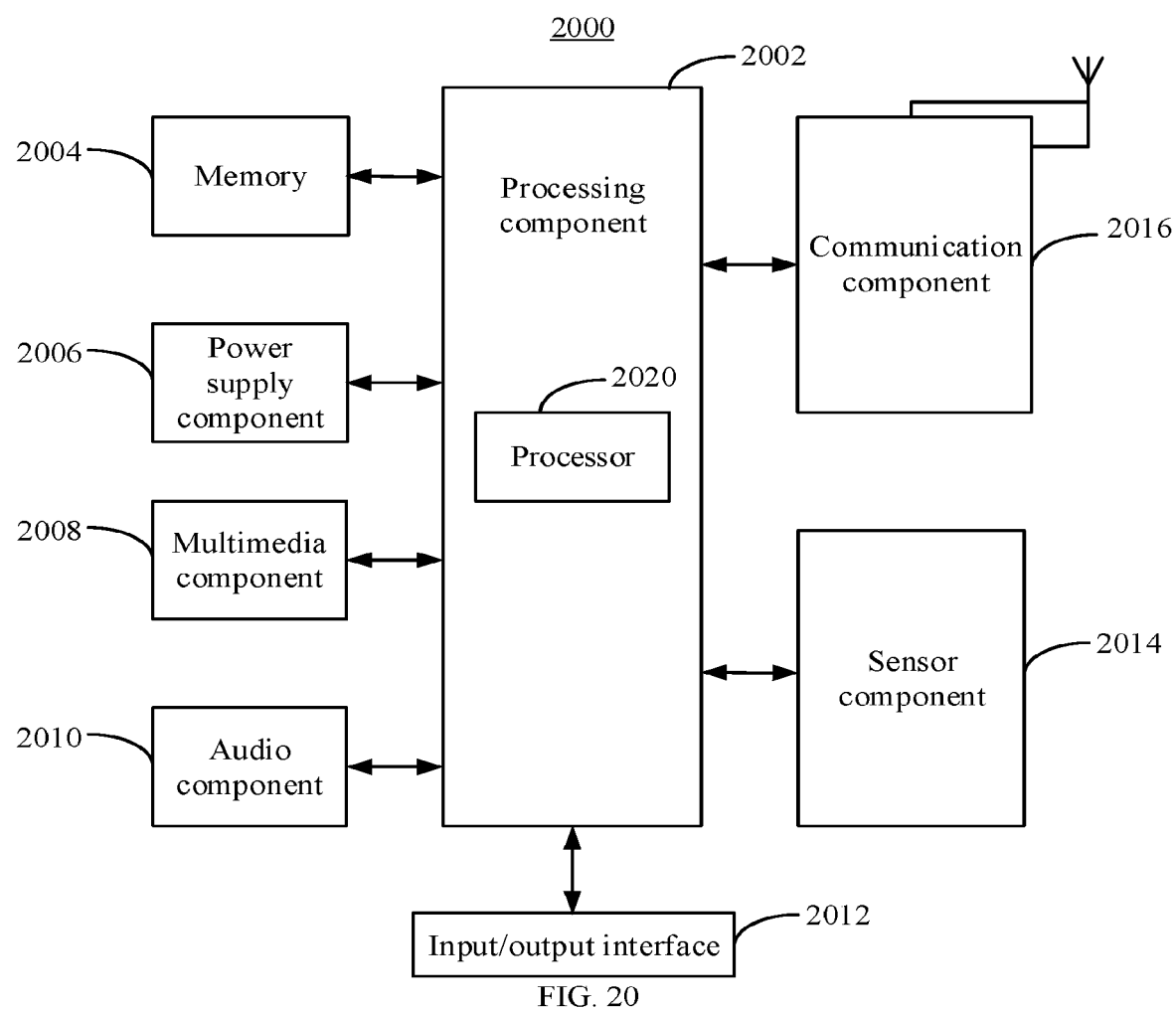
FIG. 20 is a schematic diagram illustrating an apparatus for communication control according to an embodiment of the present disclosure.

FIG. 20 is a schematic diagram illustrating an apparatus 2000 for communication control according to an embodiment of the present disclosure. For example, the apparatus 2000 may be a mobile phone, a computer, a digital broadcast terminal, a message transceiver, a game console, a tablet device, a medical device, a fitness device, a personal digital assistant and the like.

As shown in FIG. 20, the apparatus 2000 may include one or more of the following components: a processing component 2002, a memory 2004, a power supply component 2006, a multimedia component 2008, an audio component 2010, an input/output (I/O) interface 2012, a sensor component 2014 and a communication component 2016.

The processing component 2002 generally controls overall operations of the apparatus 2000, such as operations associated with display, phone calls, data communications, camera operations, and recording operations. The processing component 2002 may include one or more processors 2020 to execute instructions to complete all or part of the steps of the above communication control method applicable to the terminal. In addition, the processing component 2002 may include one or more modules which facilitate the interaction between the processing component 2002 and other components. For example, the processing component 2002 may include a multimedia module to facilitate the interaction between the multimedia component 2008 and the processing component 2002.

The memory 2004 is configured to store various types of data to support the operation of the apparatus 2000. Examples of such data include instructions for any application or method operated on the apparatus 2000, contact person data, phonebook data, messages, pictures, videos, and so on. The memory 2004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2006 supplies power for different components of the apparatus 2000. The power supply component 2006 may include a power supply management system, one or more power supplies, and other components associated with generating, managing and distributing power for the apparatus 2000.

The multimedia component 2008 includes a screen that provides an output interface between the apparatus 2000 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2008 includes a front camera and/or a rear camera. When the apparatus 2000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2010 is configured to output and/or input audio signals. For example, the audio component 2010 includes a microphone (MIC) configured to receive an external audio signal when the apparatus 2000 is in an operation mode, such as a call mode, a recording mode, and a voice recognition mode. The received audio signal may be further stored in the memory 2004 or transmitted via the communication component 2016. In some examples, the audio component 2010 also includes a loudspeaker for outputting an audio signal.

The I/O interface 2012 provides an interface between the processing component 2002 and a peripheral interface module which may be a keyboard, a click wheel, a button, or the like. These buttons may include, but are not limited to a home button, a volume button, a start button, and a lock button.

The sensor component 2014 includes one or more sensors for providing a status assessment in various aspects to the apparatus 2000. For example, the sensor component 2014 may detect an open/closed state of the apparatus 2000, and the relative positioning of components, for example, the component is a display and a keypad of the apparatus 2000. The sensor component 2014 may also detect a change in position of the apparatus 2000 or a component of the apparatus 2000, the presence or absence of a user in contact with the apparatus 2000, the orientation or acceleration/deceleration of the apparatus 2000 and a change in temperature of the apparatus 2000. The sensor component 2014 may include a proximity sensor configured to detect the presence of nearby objects without any physical contact. The sensor component 2014 may also include a light sensor, such as a CMOS or CCD image sensor, for use in imaging applications. In some examples, the sensor component 2014 may also include an acceleration sensor, a gyro sensor, a magnetic sensor, a pressure sensor, or a temperature sensor.

The communication component 2016 is configured to facilitate wired or wireless communication between the apparatus 2000 and other devices. The apparatus 2000 may access a wireless network based on any communication standard, such as WiFi, 2G or 3G, 4G LTE, 5G NR or a combination thereof. In an example, the communication component 2016 receives broadcast signals or broadcast associated information from an external broadcast management system via a broadcast channel. In an example, the communication component 2016 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the apparatus 2000 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above communication control method applicable to the terminal.

In an example, there is also provided a non-transitory computer readable storage medium including instructions, such as a memory 2014 including instructions, where the instructions are executable by the processor 2020 of the apparatus 2000 to perform the method as described above. For example, the non-transitory computer readable storage medium may be a read only memory (ROM), a random access memory (RAM), a CD-ROM, a magnetic tape, a floppy disk, and an optical data storage device etc.

In the embodiments of the present disclosure, the radio access technology based on which the terminal and the base station communicate with each other can be changed based on the service type of the communication. Thus, the terminal may not always communicate based on a radio access technology with large power consumption but switch to a radio access technology with small power consumption for communication based on the service type, thereby further reducing the power consumption in use of the terminal and improving the endurance capability of the terminal.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A communication control method, comprising:
sending, by a terminal, information on radio access technologies supported by the terminal to a base station;
receiving, by the terminal, an association relationship between each of the radio access technologies and a corresponding service type from the base station;
when it is required to perform communication of a service with the base station, determining, by the terminal, a target radio access technology corresponding to the service type of the service based on the association relationship; and
performing, by the terminal, communication of the service with the base station based on the target radio access technology;
wherein receiving the association relationship between each of the radio access technologies and the corresponding service type from the base station comprises:
receiving a radio resource control release signaling from the base station; and
acquiring the association relationship from the radio resource control release signaling;
wherein when it is required to perform communication of the service with the base station, determining the target radio access technology corresponding to the service type of the service based on the association relationship comprises:
when initiating an uplink service, acquiring a quality-of-service flow identifier of the uplink service;
determining a service type of the uplink service based on the quality-of-service flow identifier; and
determining a target radio access technology corresponding to the service type of the uplink service based on the association relationship.

2. The communication control method of claim 1, wherein when it is required to perform communication of the service with the base station, determining the target radio access technology corresponding to the service type of the service based on the association relationship comprises:
receiving a paging signaling from the base station;
acquiring information on a service type of a downlink service from the paging signaling; and
determining a target radio access technology corresponding to the service type of the downlink service based on the association relationship.

3. A communication control method, comprising:
receiving, by a base station, information on radio access technologies supported by a terminal from the terminal;
establishing, by the base station, an association relationship between each of the radio access technologies and a corresponding service type; and
sending, by the base station, the association relationship to the terminal;
when initiating a downlink service to the terminal, determining a target radio access technology corresponding to a service type of the downlink service based on the association relationship; and
performing communication of the downlink service with the terminal based on the target radio access technology;
wherein when initiating a downlink service to the terminal, determining the target radio access technology corresponding to the service type of the downlink service based on the association relationship comprises:
when initiating a downlink service to the terminal, acquiring a quality-of-service flow identifier of the downlink service;
determining a service type of the downlink service based on the quality-of-service flow identifier; and
determining a target radio access technology corresponding to the service type of the downlink service based on the association relationship.

4. The communication control method of claim 3, wherein the terminal is in an idle state; before performing communication of the downlink service with the terminal based on the target radio access technology, the method further comprises:
sending a paging signaling to the terminal, wherein the paging signaling comprises information on the service type of the downlink service.

5. The communication control method of claim 3, wherein sending the association relationship to the terminal comprises:
sending a radio resource control release signaling to the terminal, wherein the radio resource control release signaling comprises the association relationship.

6. The communication control method of claim 3, wherein establishing the association relationship between each of the radio access technologies and the corresponding service type comprises:
determining first communication rates supported by the radio access technologies and second communication rates required by one or more service types; and
for the first communication rate and the second communication rate which are matched to each other,
associating the radio access technology and the service type respectively corresponding to the matched first communication rate and second communication rate.

7. An electronic device, comprising:
a processor; and
a memory, configured to store instructions executable by the processor;
wherein the processor is configured to perform the following operations comprising:
sending information on radio access technologies supported by a terminal to a base station;
receiving an association relationship between each of the radio access technologies and a corresponding service type from the base station;
when it is required to perform communication of a service with the base station, determining a target radio access technology corresponding to the service type of the service based on the association relationship; and
performing communication of the service with the base station based on the target radio access technology;
wherein when receiving the association relationship between each of the radio access technologies and the corresponding service type from the base station, the processor is configured to:
receive a radio resource control release signaling from the base station; and
acquire the association relationship from the radio resource control release signaling;

wherein when determining the target radio access technology corresponding to the service type of the service based on the association relationship, the processor is configured to:
when initiating an uplink service, acquire a quality-of-service flow identifier of the uplink service;
determine a service type of the uplink service based on the quality-of-service flow identifier; and
determine a target radio access technology corresponding to the service type of the uplink service based on the association relationship.

8. The electronic device of claim 7, wherein when determining the target radio access technology corresponding to the service type of the service based on the association relationship, the processor is configured to:
receive a paging signaling from the base station;
acquire information on a service type of a downlink service from the paging signaling; and
determine a target radio access technology corresponding to the service type of the downlink service based on the association relationship.

9. An electronic device, comprising:
a processor; and
a memory, configured to store instructions executable by the processor;
wherein the processor is configured to perform the communication control method of claim 3.

10. The electronic device of claim 9, wherein the terminal is in an idle state; before performing communication of the downlink service with the terminal based on the target radio access technology, the processor is further configured to:
send a paging signaling to the terminal, wherein the paging signaling comprises information on the service type of the downlink service.

11. The electronic device of claim 9, wherein when sending the association relationship to the terminal, the processor is configured to:
send a radio resource control release signaling to the terminal, wherein the radio resource control release signaling comprises the association relationship.

12. The electronic device of claim 9, wherein when establishing the association relationship between each of the radio access technologies and the corresponding service type, the processor is configured to:
determine first communication rates supported by the radio access technologies and second communication rates required by one or more service types; and
for the first communication rate and the second communication rate which are matched to each other,
associate the radio access technology and the service type respectively corresponding to the matched first communication rate and second communication rate.

* * * * *